US012567337B2

(12) United States Patent
Behnken

(10) Patent No.: US 12,567,337 B2
(45) Date of Patent: Mar. 3, 2026

(54) METHOD AND SYSTEM FOR SWATH WIDTH NORMALIZATION DURING AIRBORNE COLLECTION OF TERRAIN DATA

(71) Applicant: AEye, Inc., Pleasanton, CA (US)

(72) Inventor: Barry Behnken, Monument, CO (US)

(73) Assignee: AEye, Inc., Pleasanton, CA (US)

( * ) Notice: Subject to any disclaimer, the term of this patent is extended or adjusted under 35 U.S.C. 154(b) by 139 days.

(21) Appl. No.: 17/832,284

(22) Filed: Jun. 3, 2022

(65) Prior Publication Data

US 2023/0162611 A1     May 25, 2023

Related U.S. Application Data

(60) Provisional application No. 63/281,556, filed on Nov. 19, 2021.

(51) Int. Cl.
G08G 5/74        (2025.01)
G01S 17/89       (2020.01)

(52) U.S. Cl.
CPC ............... G08G 5/74 (2025.01); G01S 17/89 (2013.01)

(58) Field of Classification Search
CPC .............................. G08G 5/0086; G01S 17/89
USPC ............................................................ 701/3
See application file for complete search history.

(56) References Cited

U.S. PATENT DOCUMENTS

| | | | |
|---|---|---|---|
| 2013/0257852 A1* | 10/2013 | Meeker | G01C 23/00 |
| | | | 345/419 |
| 2015/0301180 A1* | 10/2015 | Stettner | G01S 7/4863 |
| | | | 257/448 |
| 2016/0259058 A1* | 9/2016 | Verheggen | G01S 7/4817 |
| 2018/0284286 A1* | 10/2018 | Eichenholz | G01S 17/89 |
| 2018/0372863 A1* | 12/2018 | Shin | G01S 13/9005 |
| 2019/0295423 A1* | 9/2019 | Dow | G08G 5/55 |
| 2020/0327696 A1* | 10/2020 | Habib | G01S 17/86 |
| 2021/0051311 A1* | 2/2021 | Lapstun | H04N 13/243 |

* cited by examiner

*Primary Examiner* — Hunter B Lonsberry
*Assistant Examiner* — Helen Li
(74) *Attorney, Agent, or Firm* — Ahmann Kloke LLP

(57)         ABSTRACT

Embodiments of the present disclosure relate generally to terrain mapping, and more particularly to a method and system for maintaining a normalized view of a terrain during an airborne data collection process. Embodiments include an intelligent sensing methodology that, on a near-real time basis, continually monitors the geometry and instantaneous height of the immediate region (voxel) under collection by an airborne sensor, thus maintaining complete, continual situational awareness of the topography under investigation. In this manner, swath asymmetries and occlusions resulting from pronounced elevation peaks can be fully assessed, quantified, and remedied at the terminus of and/or during each scan. In some embodiments, this is done by adjusting the platform's collection system scan parameters (e.g. by adjusting a scan angle for the affected direction) on a scan-by-scan basis to eliminate such asymmetries and occlusions from each collection swath.

20 Claims, 9 Drawing Sheets

METHOD AND SYSTEM FOR SWATH WIDTH NORMALIZATION DURING AIRBORNE COLLECTION OF TERRAIN DATA

CROSS-REFERENCE TO RELATED APPLICATIONS

The present application claims priority to U.S. Provisional Patent Application No. 63/281,556, filed Nov. 19, 2021, the contents of which are incorporated herein by reference in their entirety.

TECHNICAL FIELD

The present embodiments relate generally to terrain imaging and/or mapping, and more particularly to real-time management of imaging/mapping scanning parameters for swath width normalization during airborne collection of three-dimensional terrain data.

BACKGROUND

With a dramatic increase in the amount and type of autonomous control technologies becoming available and used by various platforms, maintaining accurate and up-to-date terrain imaging/mapping has become increasingly important. Many aerial imaging collection systems can be used to generate and maintain terrain maps, including LiDAR and other line-of-sight scanning/collection technologies. One of the most deleterious issues associated with aerial collection of base maps using such technologies relates to the adverse effects of topographically-variable terrain within the collection region.

It is against this technological backdrop that the present Applicant sought a technological solution to these and other problems rooted in this technology.

SUMMARY

Embodiments of the present disclosure relate generally to terrain mapping, and more particularly to a method and system for maintaining a normalized view of a terrain during an airborne data collection process. Embodiments include an intelligent sensing methodology that, on a near-real time basis, continually monitors the geometry and instantaneous height of the immediate 3D region (volume pixel, or "voxel") under collection by an airborne sensor, thus maintaining complete, continual situational awareness of the topography under investigation. In this manner, swath asymmetries resulting from occlusion by local elevation maxima can be fully assessed, quantified, and mitigated at the terminus of and/or during each scan. In some embodiments, this is done by adjusting the platform's collection system scan parameters (e.g. by adjusting a scan angle for the affected direction) on a scan-by-scan basis to eliminate such asymmetries from each collection swath.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

Figure 1A:
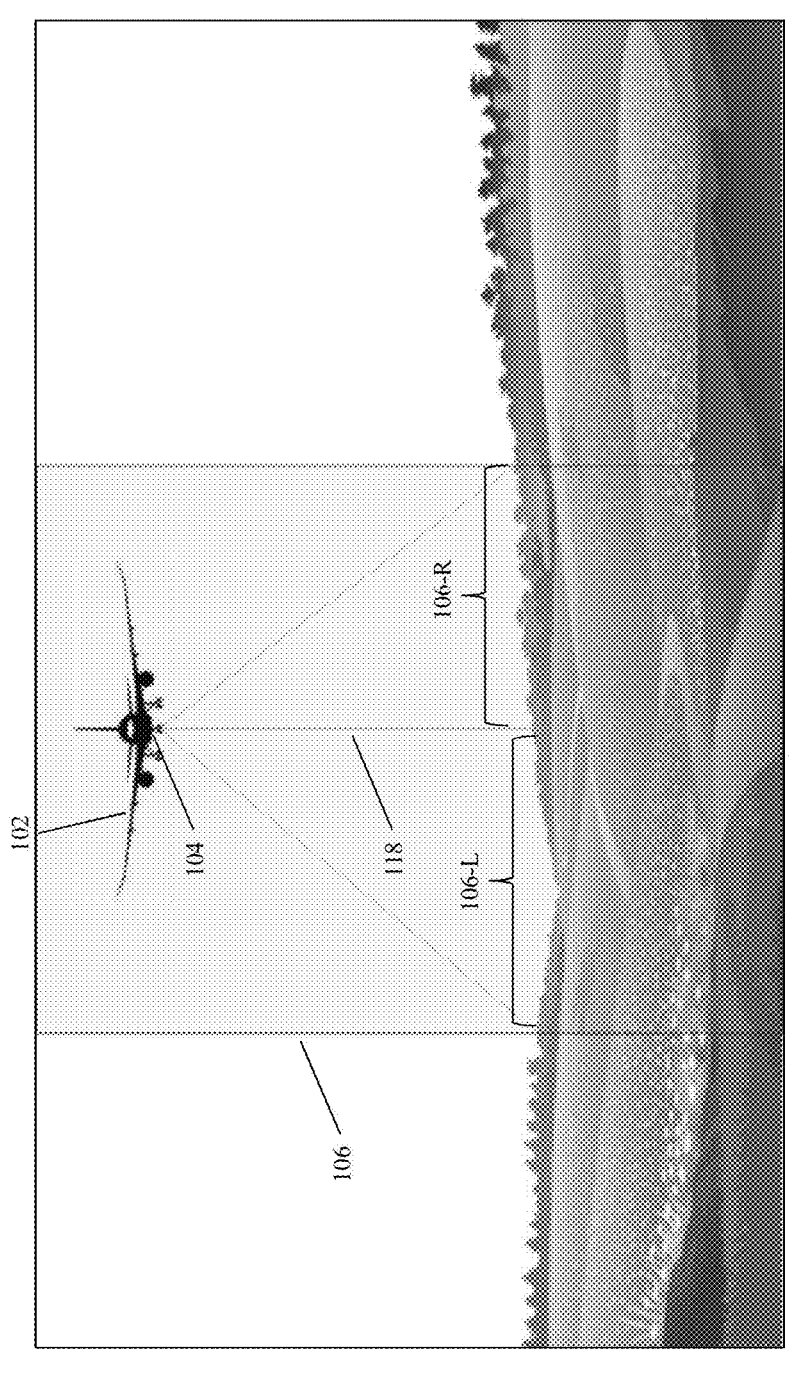
FIG. 1A illustrates an example of aerial data collection over relatively flat terrain

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments relate to maintaining a normalized view of a terrain during an airborne data collection process. Embodiments include an intelligent sensing and control methodology that, on a near-real time basis, continually monitors the geometry and instantaneous height of the immediate region (voxel) under collection by an airborne sensor, and a method for maintaining complete, continual situational awareness of the topography under investigation. In this manner, swath asymmetries resulting from occlusion by local elevation maxima can be fully assessed, quantified, and mitigated at the terminus of and/or during each scan.

As set forth above, one of the most deleterious issues associated with aerial collection of terrain base maps relates to the adverse effects of topographically-variable terrain within the collection region. Presently, during airborne collection of geospatial and/or three-dimensional data using conventional collection systems such as those based on LiDAR and other line-of-sight imaging technologies, swath width can vary significantly over the course of a collection pass. Furthermore, the more topographically variable the overall region of collection, the more problematic the final data set—and the more difficult and wasteful the task of data fusion, registration and orthorectification.

Figure 1B:
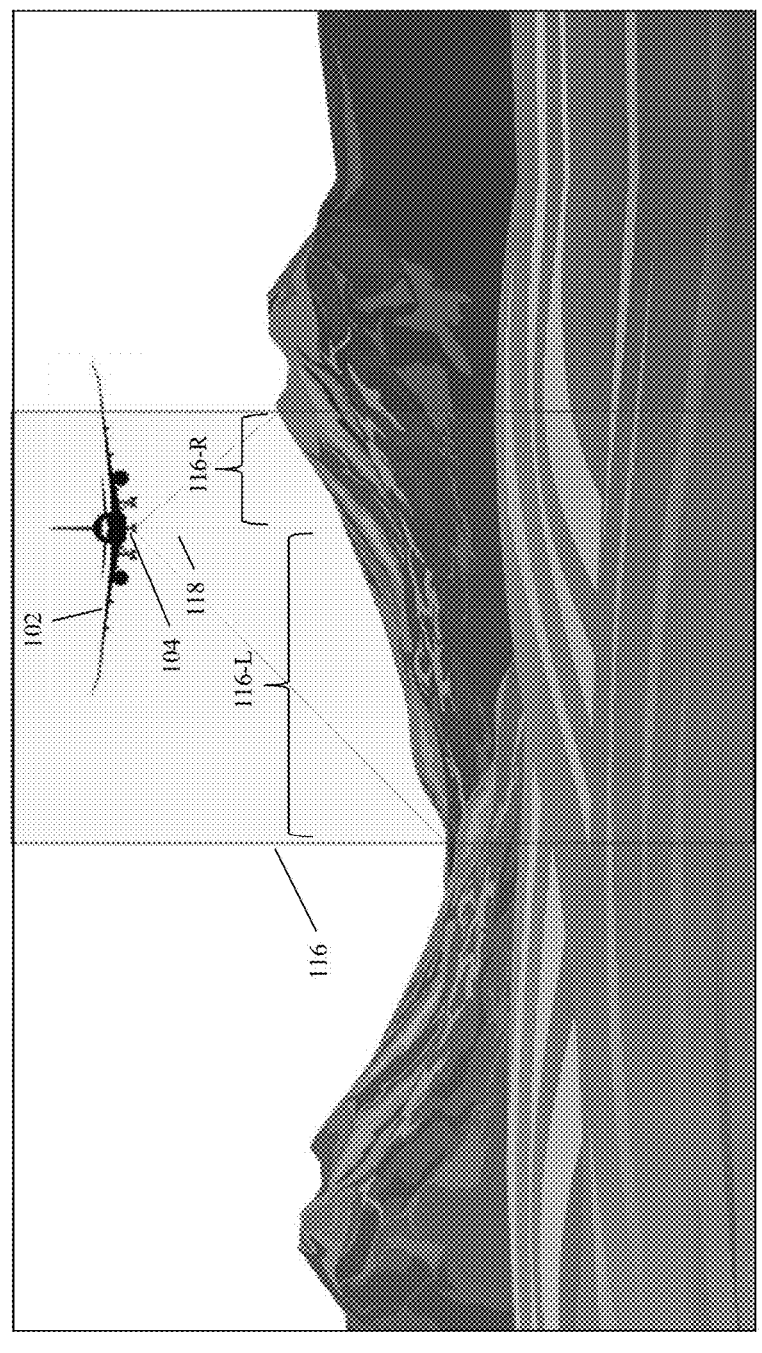
FIG. 1B illustrates an example of aerial data collection over topographically variable terrain.

FIGS. 1A and 1B are perspective views that graphically depict how terrain elevation can significantly affect the nature and symmetry of a collection system swath, as recognized by the present Applicant.

As shown in FIG. 1A, an airborne vehicle 102 over a terrain carries a collection system 104 having an imaging swath 106. For purposes of the present disclosure, vehicle 102 can include any type of piloted, autonomous, tethered, untethered, powered or unpowered airborne vehicle or platform including airplanes, helicopters, VTOL aircraft, drones, gliders, blimps, towers, etc. Also, the present disclosure is not limited to land terrain imaging, but can also include undersea terrain imaging, extraterrestrial terrain imaging, cityscape imaging, etc. Also for purposes of the present disclosure, collection system 104 refers to any type of topological/geospatial/three-dimensional data collection technology and/or system having an imaging or sensing directional line of sight, such as LiDAR, radar, sonar, infrared, etc., and capable of capturing, generating and/or collecting data useful for topological and/or terrain mapping.

In the example shown in FIG. 1A, in the case of a substantially even or level terrain, the widths 106-L and 106-R of swath 106 covering the terrain are substantially equal on both sides of vehicle 102. Conversely, as shown in the example of FIG. 1B, in the case of an uneven terrain, the widths 116-L and 116-R of swath 116 covering the terrain are substantially unequal on both sides of vehicle 102. This is because the scan angle of conventional system 104 is fixed at a given angle and equally established along a center line 118. As such, the swath width cannot be adjusted in real time to account for topographical variations in the terrain such as those shown in the case of FIG. 1B.

Figure 2A:
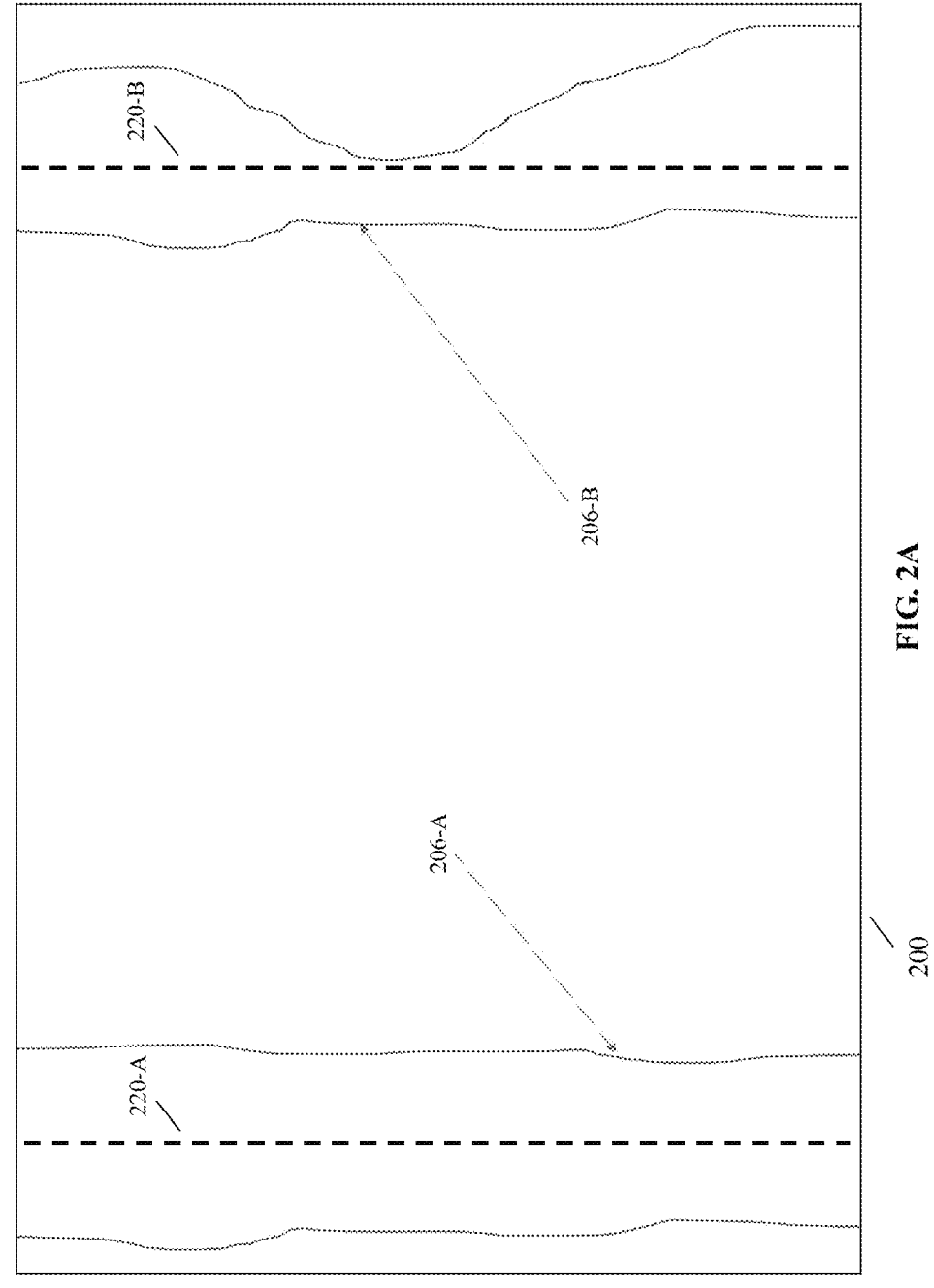
FIG. 2A illustrates an example of collection system swath patterns collected over relatively level (left) and topographically variable (right) terrain.
Figure 2B:
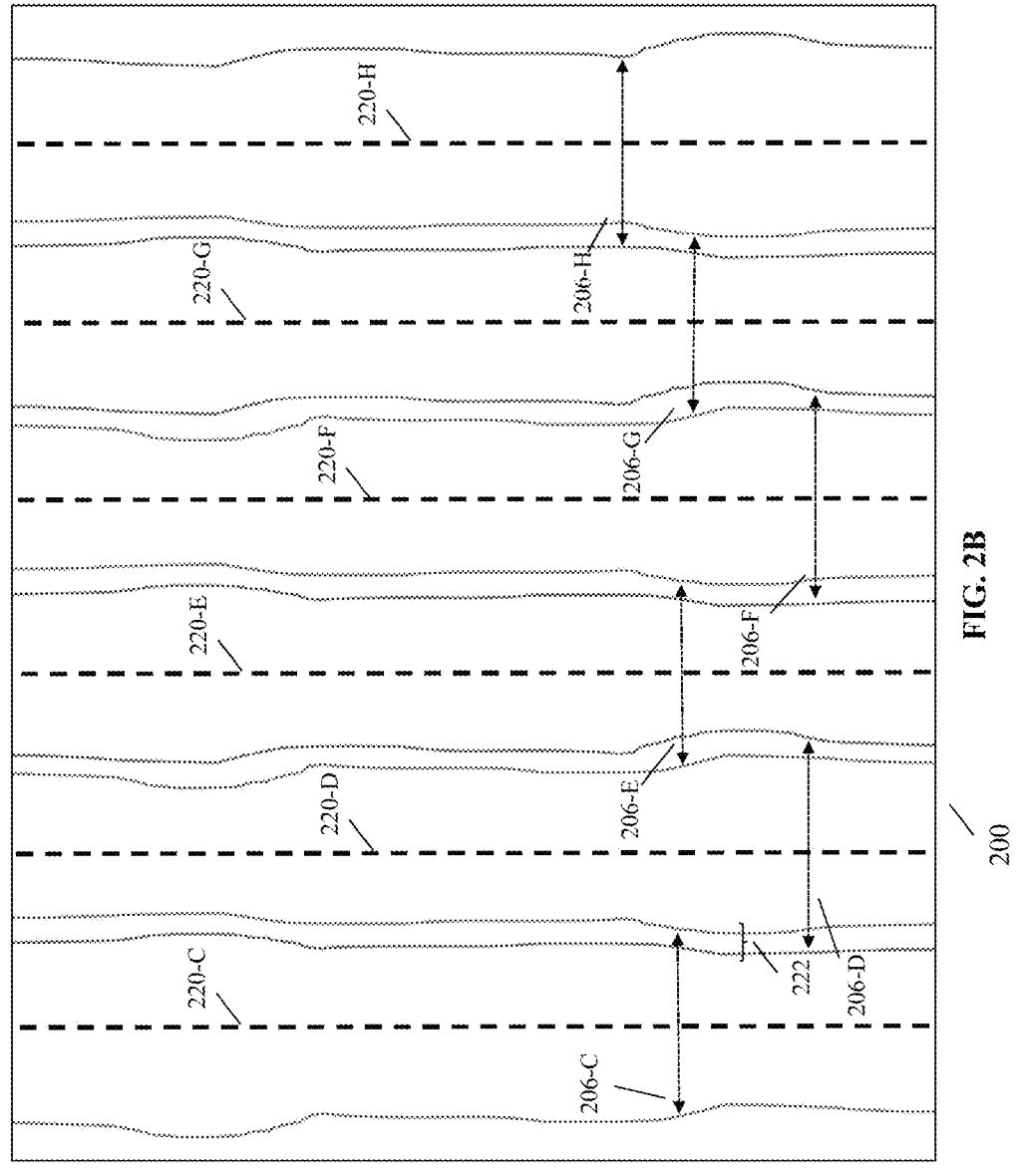
FIG. 2B illustrates an example of a full set of aerial data collection (with approximately 10% swath overlap) over relatively flat/level terrain. (Northbound collection passes are notionally depicted in blue; southbound in green.)

Further to the above, the present Applicant recognizes that the more topographically variable the terrain is in the overall region of collection, the more analytically intractable the final data set will be—and the more difficult and wasteful the task of data fusion, registration and orthorectification will be. For example, FIGS. 2A and 2B are top plan views of a region 200 for which a terrain mapping is to be performed via aerial collection. As shown in FIG. 2A, during one collection flight path 220-A, terrain data having an associated swath 206-A is collected. As shown in this example, the profile of swath 206-A is very close to a desired swath profile, having consistent coverage and being fairly uniform in width around flight path 220-A due to a relatively uniform terrain below it.

Conversely, during a different collection flight path 220-B, terrain data having an associated swath 206-B is collected. As shown in this example, the profile of swath 206-B has a very undesirable swath profile, with inconsistent coverage and being entirely non-uniform in width around flight path 220-B. This can be caused by a highly variable terrain under flight path 220-B (i.e. mountainous terrain or areas with high hills, deep valleys, etc.).

As can be appreciated from FIGS. 1A, 1B, 2A and 2B, the term "swath" as used herein refers to the geographical or physical extent of terrain covered and/or captured by the collection system 104, which is impacted by both the scan angle extent of the collection system and the topographical features of the terrain. Accordingly, given a constant maximum scan angle, the swath will be wider or narrower depending on the features of the terrain being analyzed by the collection system. Likewise, given a constant topographical terrain (e.g. a flat landscape), the swath will be wider or narrower depending on the maximum scan angle used by the collection system. It should be further appreciated that swath width can differ from scan to scan (assuming the maximum scan angle is constant) as an airborne collection system travels over a topographically varying terrain.

The present Applicant further recognizes that only under the most favorable of topographic scenarios (i.e., minimal elevation variability throughout a terrain) can a consistently uniform set of data swaths be generated and then successfully fused together in furtherance of a final geospatial 3D map. FIG. 2B illustrates the nominal geospatial mapping scheme under such near-ideal circumstances:

After a data collection mission for a region 200, comprising collection flight paths 220-C, 220D, 220-E, 220-F, 220-G and 220-H, terrain data is collected, the terrain data having respective associated swaths 206-C, 206-D, 206-E, 206-F, 206-G and 206-H. In this example, provided that swath 220-C to 220-H have fundamentally uniform profiles in which all adjacent swaths at least partially overlap, the processes of data fusion, registration and orthorectification are straightforward, and generation of the end mapping product is relatively efficient. Conversely, any scenario with nontrivial elevation variability does not lend itself to such straightforward methods.

It should be apparent that many conventional techniques for performing data fusion, registration and orthorectification can be used in conjunction with the data collection techniques of the present disclosure, and detailed descriptions of such conventional techniques are not necessary for an understanding of the present embodiments. As such, further details will be omitted here for sake of clarity of the present embodiments.

Figure 3A:
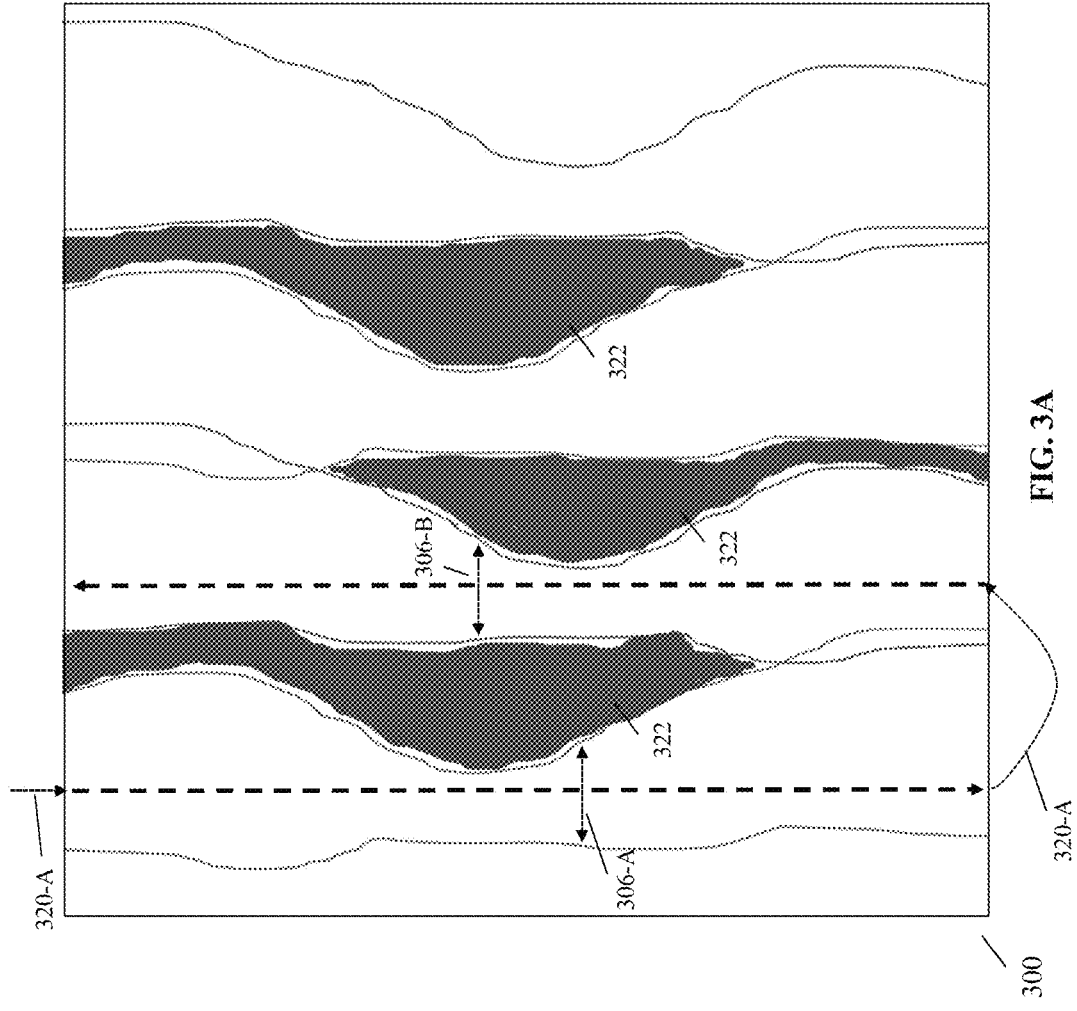
FIG. 3A illustrates example results of an aggressive collection plan in a high-relief region, with gap areas indicated in red.

In view of the foregoing, the present Applicant further recognizes that there are generally two options available to the mission planner when planning and executing the collection of geospatial imagery over topographically complicated regions of terrain:

(1) Aggressive Collection Approach: The collection platform (e.g. as configured by a mission designer) ignores or is oblivious to these topographical variations, and executes a collection scheme or sortie over region 300 having a collection flight path 320-A that essentially treats the collected terrain as flat (i.e. ignores the effects of mountains, valleys, etc.). As such, the spacings between different collection passes over region 300 are relatively wide and do not account for the widely varying terrain. Accordingly, in this example, as shown in FIG. 3A, the resulting swaths 306-A to 306-D yield significant gaps 322 in coverage, rendering the final data product (e.g. geospatial 3D map) virtually unusable for most purposes and applications.

Figure 3B:
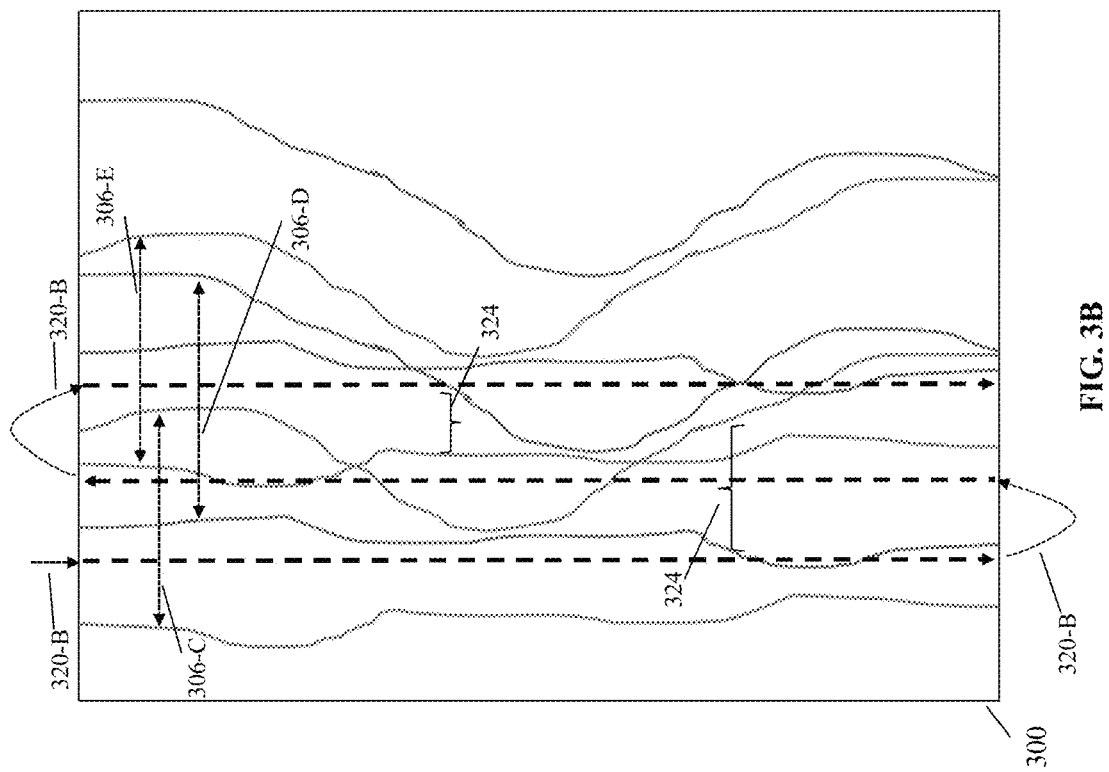
FIG. 3B illustrates example results of a conservative collection plan in a high-relief region.

(2) Conservative Collection Approach: The collection platform (e.g. as configured by a mission designer), typically through a series of complicated calculations by hand or via a computerized flight plan generator, executes a collection scheme or sortie over region 300 that ensures full overlap of all collection swaths using a collection flight path 320-B that includes many more tightly-spaced passes over region 300 as compared to collection flight path 320-A in FIG. 3A. In this example, as shown in FIG. 3B, the resulting swaths 306-E to 306-G overlap substantially and result in no gaps in coverage. On the contrary, there is considerable overlap 324 in adjacent swaths. This provides a very useful final data product (e.g. geospatial 3D map); however, this superior product as compared to the result in FIG. 3A comes at the expense of tremendous and superfluous path overlap as shown in FIG. 3B. This redundant collection of topographical data can reduce the collection efficiency of the sortie by 50% or more (e.g. by comparison of flight paths 320-A and 320-B—and at a significant expense of time, money, and capital assets.

It is thus readily apparent how crippling the effects of variable topography can be with regard to the efficient, effective capture of high-quality 3D terrain data—especially given the fact that the geospatial data market has become largely commoditized (with corresponding thin profit margins) over the past 10+ years. There is thus a profound need for a more intelligent, agile method of collection that simultaneously eliminates gaps and minimizes collection waste.

In accordance with certain general aspects, the present embodiments provide an intelligent sensing methodology that, on a near-real time basis, continually monitors the geometry and instantaneous height of the immediate region (e.g. voxel) under collection by an airborne sensor (e.g. LiDAR sensor), thus maintaining complete, continual situational awareness of the topography under investigation. In this manner, swath asymmetries resulting from occlusion by local elevation maxima and/or minima can be fully assessed, quantified, and mitigated at the terminus of (and, in fact, during) each scan; more importantly, the platform's collection data scan parameters can be adjusted on a scan-by-scan basis to eliminate such asymmetries from each collection swath. The result is a geospatial collection product that much more closely resembles FIG. 2B than either FIG. 3A or FIG. 3B, even in areas of extreme topographical relief.

One example "iDAR" data collection system according to embodiments comprises an agile sensing LiDAR (i.e. ladar) system. Such an agile sensor system has, among other capabilities, the ability to adjust scan and laser shot parameters on a scan-by-scan and, indeed, even a shot-by-shot basis. As such, this preferred architecture is uniquely capable of providing a robust and elegant solution to the problem of inefficient, non-uniform swath generation.

Figure 4:
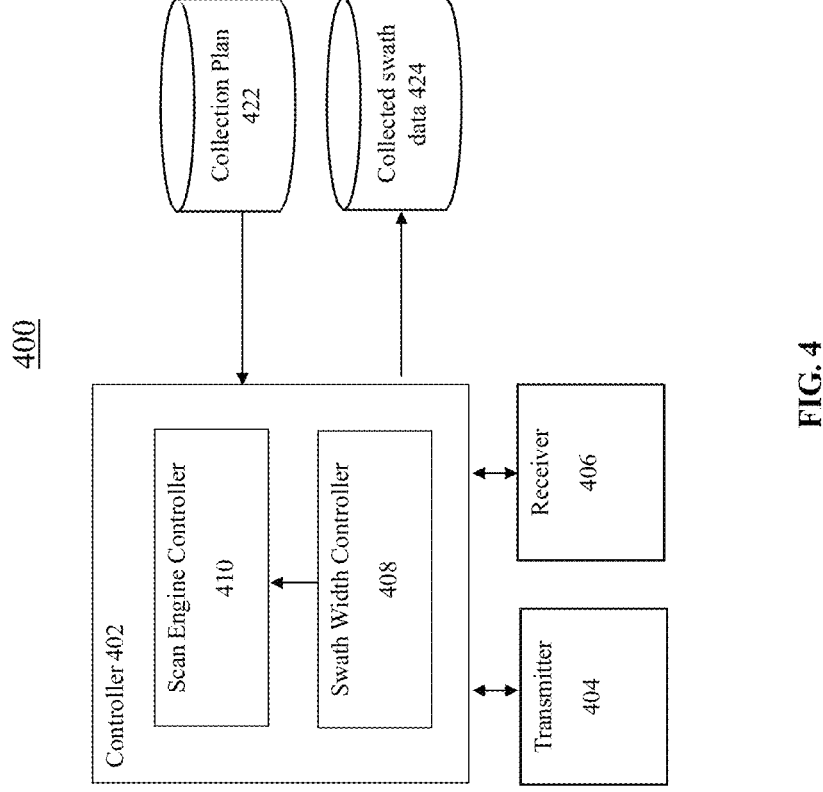
FIG. 4 is an example system diagram according to embodiments.

An example LiDAR system 400 that can implement and/or replace system 104 in FIG. 1 is shown in FIG. 4. As shown, system 400 includes a controller 402, a transmitter 404 and a receiver 406. It should be apparent that system 400 can include additional or fewer components than shown in FIG. 4. However, the details of any additional components that can be included, as well as details regarding functionalities of the illustrated components that are not necessary for an understanding of the present embodiments, are omitted here for sake of clarity of the present disclosure. Moreover, although shown together in FIG. 4, this illustration is also not limiting. In particular, some, all, or none of the components in FIG. 4 may be separately located and/or may communicate with each other through various wired and wireless technologies.

In example LiDAR system 400, transmitter 404 includes a light source comprising a laser and receiver 406 includes a sensor comprising charge-coupled devices (CCDs). Transmitter 404 and receiver 406 are preferably provided in a bistatic architecture, having independently controllable optical paths, one or both of which can include a set of scanning mirrors controlled by controller 402, projection/focusing optics, filters, etc. An example system that can be adapted for use in the present embodiments is described in U.S. Pat. No. 9,885,778, the contents of which are incorporated herein by reference in their entirety.

Controller 402 receives plan information from collection plan 422, such as information from topographical maps of the overflight area, flight collection parameters for the upcoming sortie such as airspeed, flight altitude, GPS coordinates of the boundaries of the region to be analyzed, beginning and ending GPS coordinates of collection passes through the region, number of collection passes, directions of collection passes, etc.

Controller 402 stores image data in terrain image data repository 424. This can include raw voxel data from receiver 406 in addition to metadata (e.g. time, GPS geolocation position stamps, etc.)

According to certain "agile LiDAR" aspects, and as described in the incorporated patent, controller 402 includes a scan engine controller 410 that is capable of implementing a shot selection strategy in addition to, or in place of, a conventional raster scan strategy. In this regard, controller 410 is able to cause transmitter 404 to illuminate an environment using a raster scan strategy similar to conventional strategies, or using a group of individually programmed shots in a certain target area within an environment, or any combination thereof. Of particular relevance to the present disclosure, scan engine controller 410 is able to cause transmitter 404 to illuminate an environment (e.g. terrain) using a dynamically adjustable scan angle.

According to certain additional aspects of the present disclosure, controller 402 further includes a swath width controller 408. As mentioned above, and as described in more detail herein, swath width controller 408 is configured to analyze data collected from receiver 406 in conjunction with an area illuminated by transmitter 404, and to dynamically determine or adjust a swath width for a terrain being imaged. As shown in this example, swath width controller 408 does this by communicating with scan engine controller 410, for example by providing dynamic scan parameters to scan engine controller 410, so as to cause system 400 to maintain a substantially uniform swath width in accordance with the present embodiments.

Figure 5:
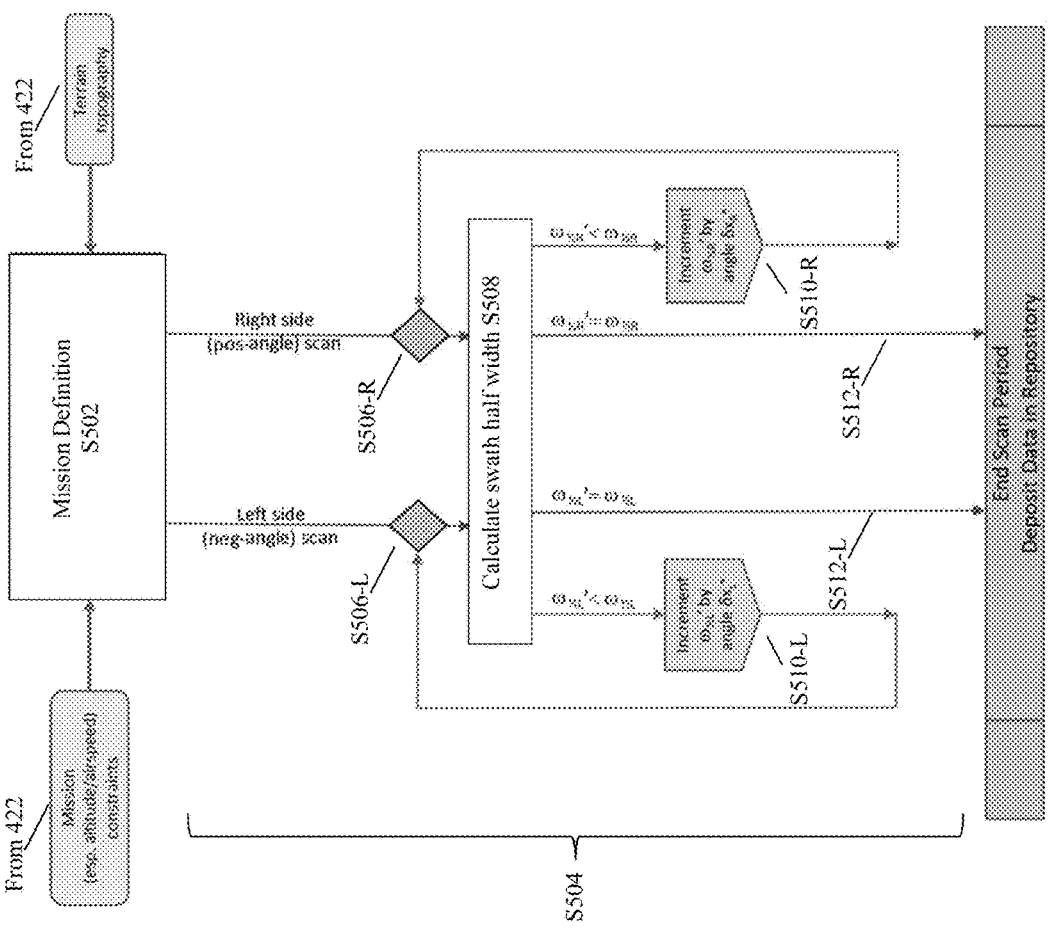
FIG. 5 is a flowchart of an example methodology according to embodiments.

One example airborne LiDAR collection methodology according to embodiments is shown in FIG. 5.

As shown in this example, processing begins in S502 with a LiDAR mission definition. In advance of the collection sortie, and informed by a review of topographical maps of the overflight area, the flight collection parameters from 422 for the upcoming sortie (e.g. airspeed, flight altitude, etc.) are considered and then established/definitized as part of the mission. These can be considered along with other LiDAR system parameters such as scan rate, pulse/shot rate, maximum scan angle, etc.

In step S502, paired with these flight parameters, a nominal or "standard" (total) swath width ω for the sortie is selected—one that is laterally symmetric about the aircraft's body axis (measured in distance). This swath width "baseline" can be, for example, the swath width generated when operating the LiDAR sensor at the designated flight altitude over the lowest (and preferably level) region of the collection sortie. It should be apparent, however, that an elevation at other portions of the collection sortie can be selected as the baseline, and need not be the absolute lowest or other maximum or minimum elevation in the region being analyzed. Those skilled in the art will understand how to determine a swath width using flight collection parameters such as those described above after being taught by the present examples.

Figure 6:
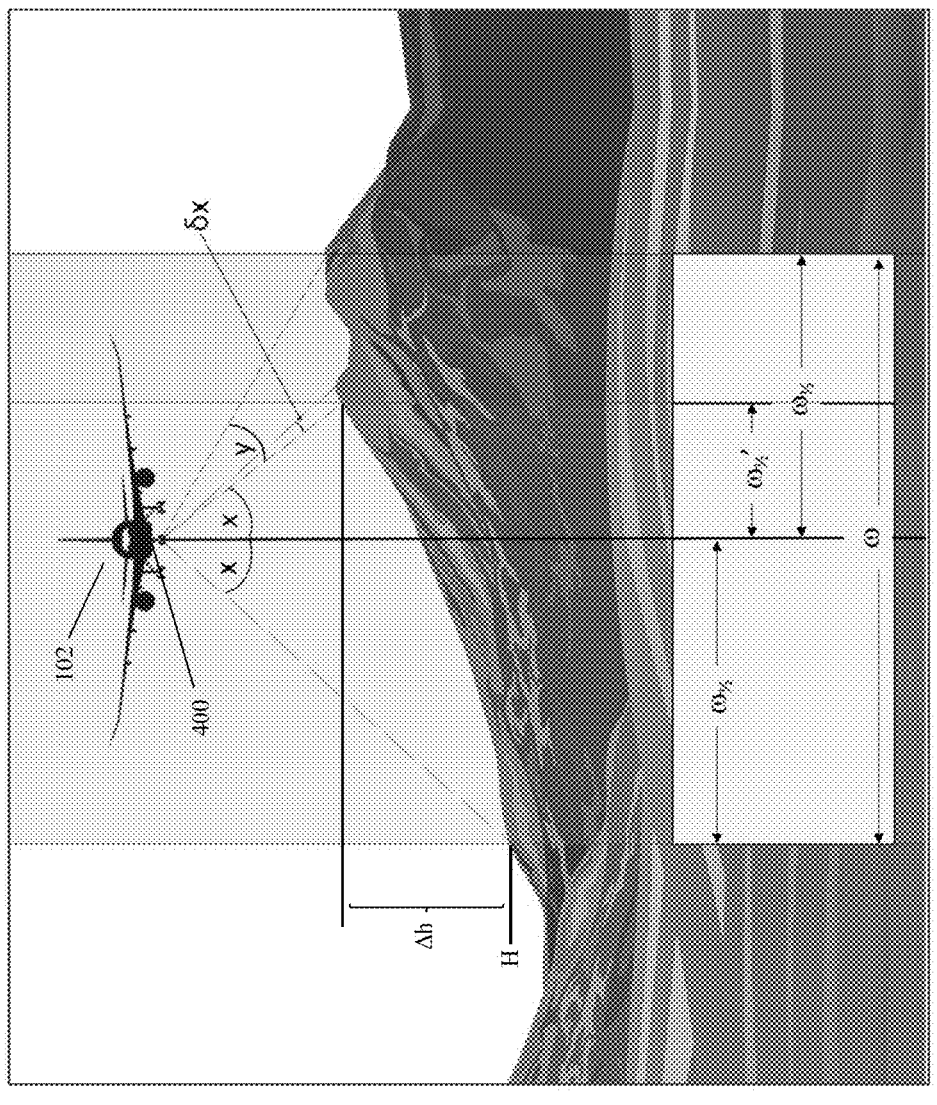
FIG. 6 illustrates example swath width normalization over high-relief topographic areas, via augmentation of nominal half-scan angle (x) by y. $y=A(\delta x)$, where A is an integer greater than or equal to zero, according to embodiments.

In the example shown in FIG. 6, the baseline elevation H occurs on the left side of vehicle 102 during a particular portion of the sortie. The scan half-angle x is the angle used by system 400 to collect data from this lowest elevation point in the terrain. This scan half-angle also corresponds to the baseline swath width ω. For example, a nominal collection baseline might be a flight altitude (e.g. above the lowest, predominantly flat region of the sortie) of 20,000 ft AGL, a (full) scan angle of 2x=10°, and a resulting nominal swath width ω of 1.06 km.

During flight, processing enters a loop S504 of steps that are performed for each single combined scan from both a left side and a right side of the collection platform (e.g. a complete collection scan between a left most side of the collection platform and a right most side of the collection platform at each point in a flight path from one end of a collection region to the opposite end of the collection region).

In S506-L and S506-R, a shot is fired by transmitter 404 (e.g. a LiDAR pulse) based on the current scan parameter settings determined by scan engine controller 410 and swath width controller 408. For ease of illustration, FIG. 5 illustrates processing for half scans performed for both left and right sides of a collection platform. However, it should be apparent that processing steps S508 and S510 are performed for one shot at a time, starting from directly below the platform (e.g. a scan angle of zero) and at an increasing scan angle with respect to one side of the collection platform for each iteration of loop S504. Once it has been determined that a desired swath half-width has been achieved for one side of the platform (e.g. left or right) in a given scan (as indicated by S512), processing is initiated for the other side of the platform, starting from directly below the platform (e.g. a scan angle of zero). Processing proceeds for this other side of the platform until the desired swath half-width has been achieved for this other side of the platform also, upon which processing for the given scan is complete, and processing for a new scan is performed, or a new collection path is initiated.

In S508, using the platform airspeed, instantaneous scan angle, and time-of-flight for photon returns from the most recent LiDAR detection event (i.e. ground return voxel), an algorithm in swath width controller 408 according to embodiments determines (on a half-scan-cycle basis) the instantaneous height and resulting swath half-width for the current shot. For example, as shown in FIG. 6, system 400 fires a shot at a scan angle x on the right side of the platform. Based on the voxel information returned by the receiver 406 at this point, the height h relative to a predetermined elevation baseline H of the most recent ground return is determined. From this height information h, the resulting half-width of the current collection swath, $\omega_{1/2}'$ for this scan angle x can be calculated by simple geometrical transformation.

Using available measurements and calculated geometry of the instantaneous scenario, the algorithm establishes that some additional scan authority may be required to maintain the standard swath half width $\omega_{1/2}$ for the current half scan on the right side of the platform. However, since it is not possible to know, a priori, the nature of topographic relief beyond the scan half-angle angle x, it is not possible to calculate at this stage what specific additional half-angle scan y is required to maintain the standard swath width $\omega_{1/2}$ for the current half scan. All that is known is that the current half-scan angle x may be insufficient for purposes of maintaining swath width homogeneity. The need for a marginal increase to the baseline half-scan angle can be implemented as a set of instructions to the scan engine controller 410.

As shown in FIG. 5, in steps S510-L and S510-R, the swath width controller 408, as needed, instructs the scan engine controller 410 to increase the current scan angle (for example x as shown in FIG. 6) by a marginal angle, δx (for example, 0.5 deg), so as to increase $\omega_{1/2}'$ by a resulting incremental width. With the goal for each half-scan being to incrementally increase $\omega_{1/2}'$ until it is equivalent (at least approximately) to the baseline swath width $\omega_{1/2}$, steps S506 and S508 are repeated for the new angle [x+δx]. Accordingly, this process is repeated until $\omega_{1/2}'=\omega_{1/2}$, (as shown in S512-L and S512-R) or at least (given algorithmic and timing limitations) $\omega_{1/2}'\approx\omega_{1/2}$.

It should be noted that, with respect to the example shown in FIG. 6, the final half-scan angle for the right side of the platform is ultimately defined by y=x+A δx, where A is an integer greater than or equal to zero, and is equal to the number of loop S504 iterations that are necessary to secure $\omega_{1/2}'=\omega_{1/2}$. It should be noted that for the situation in which no incremental increase in x is deemed necessary (e.g. no topographical complication is at play with respect to the baseline topographical situation), A=0 and y=x.

Upon the conclusion of one LiDAR collection pass, the aircraft executes a 180° turn and commences LiDAR collection in a direction that is antiparallel to, but laterally offset from, the previous pass, such that no more than 5-10% of the previous collection region is re-collected in the new pass. However, some nominal (i.e., 5%) amount of re-collection via swath overlap is preferred in order to ensure (a) the final map is not afflicted with gaps in coverage; (b) there is sufficient common geospatial data between each pair of successive passes to support precise splicing and registration of the disparate data sources, ensuring a properly fused and fully-orthorectified final 3D geospatial map product.

After flight, and/or at some point upon the conclusion of any LiDAR collection sortie, a 3D geospatial map is produced by processing and then splicing together the complete set of resulting LiDAR data swaths. Some amount of swath overlap is preferred for the success of this process; any gaps in coverage, such as those depicted in FIG. 3A, can render the full sortie collection product entirely unusable. On the other hand, as suggested by FIG. 3B, a lack of swath width uniformity can make this overlap and fusion process exceptionally inefficient. By taking a proactive technical approach to ensuring swath width homogeneity across each individual collection pass according to aspects of the embodiments, a significant improvement in geospatial mapping efficiency can be realized and capitalized upon.

As set forth above, many conventional techniques for performing data fusion, registration and orthorectification can be used in conjunction with the data collection techniques of the present disclosure, and detailed descriptions of such conventional techniques are not necessary for an understanding of the present embodiments. As such, further details will be omitted here for sake of clarity of the present embodiments.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method implemented by a terrain information collection system comprising:
collecting sensor data for a region of a terrain;
monitoring information relevant to a baseline swath width based on the collected sensor data; and
using the monitored information, determining collection system parameters for maintaining a constant swath width over the region of the terrain, the collection system parameters including scan angle used by the collection system, the determining including dividing the baseline swath width into two subsections, each of the two subsections having a swath width that is half that of the constant swath width, for each subsection, increasing or decreasing a particular subsection scan angle used by the collection system based on the terrain of the region in the particular subsection such that the swath width of the particular subsection is equal to half the constant swath width.

2. The method of claim 1, wherein the monitored information includes an instantaneous height of a portion of the region.

3. The method of claim 2, wherein the instantaneous height is obtained from a voxel obtained in the region by the collection system.

4. The method of claim 1, wherein the collection system parameters include a maximum scan angle used by the collection system.

5. The method of claim 2, wherein the collection system parameters includes a scan angle used by the collection system, and wherein determining the collection system parameters includes determining whether the scan angle needs to be adjusted based on the instantaneous height so as to maintain the constant swath width.

6. The method of claim 1, wherein the collection system comprises a line-of-sight transmitter and receiver.

7. The method of claim 1, wherein the collection system comprises a LiDAR transmitter and receiver.

8. A method implemented by a terrain information collection system comprising:

monitoring information relevant to a swath width based on sensor data collected by the collection system in a region of the terrain; and using the monitored information, adjusting a scan angle used by the collection system so as to maintain a constant swath width over the region of the terrain the adjusting includes dividing the swath width into two subsections, each of the two subsections having a swath width that is half of that of the constant swath width, for each subsection, increasing or decreasing a particular subsection scan angle used by the collection system based on the terrain of the region in the particular subsection such that the swath width of the particular subsection is equal to half the swath width.

9. The method of claim 8, wherein the monitored information includes an instantaneous height of a portion of the region.

10. The method of claim 9, wherein the instantaneous height is obtained from a voxel obtained in the region by the collection system.

11. The method of claim 9, wherein adjusting the scan angle includes determining whether the scan angle needs to be increased based on the instantaneous height so as to maintain the constant swath width.

12. The method of claim 8, wherein the collection system comprises a line-of-sight transmitter and receiver.

13. The method of claim 8, wherein the collection system comprises a LiDAR transmitter and receiver.

14. A terrain information collection system comprising:

an interface to a receiver for collecting sensor data for a region of a terrain; and a swath width controller configured to:

monitor information relevant to a swath width based on the collected sensor data; and using the monitored information, determine collection system parameters for maintaining a constant swath width over the region of the terrain, the collection system parameters including scale angle used by the collection system, the determining including dividing the swath width into two subsections, each of the two subsection having a swath width that is half that of the constant swath width, for each subsection, increasing or decreasing a particular subsection scan angle used by the collection system based on the terrain of the region in the particular subsection such that the swath width of the particular subsection is equal to half the constant swath width.

15. The system of claim 14, wherein the monitored information includes an instantaneous height of a portion of the region.

16. The system of claim 15, wherein the instantaneous height is obtained from a voxel obtained in the region by the collection system.

17. The system of claim 14, wherein the collection system parameters include a maximum scan angle used by the collection system.

18. The system of claim 15, wherein the collection system parameters includes a scan angle used by the collection system, and wherein determining the collection system parameters includes determining whether the scan angle needs to be adjusted based on the instantaneous height so as to maintain the constant swath width.

19. The system of claim 14, further comprising a line-of-sight transmitter and receiver.

20. The system of claim 14, further comprising a LiDAR transmitter and receiver.

* * * * *